United States Patent
Alvarez Olivera et al.

(10) Patent No.: US 12,486,825 B2
(45) Date of Patent: Dec. 2, 2025

(54) HUB HYDRAULIC ASSEMBLY FOR A WIND TURBINE ROTOR

(71) Applicant: Siemens Gamesa Renewable Energy A/S, Brande (DK)

(72) Inventors: Johann Alvarez Olivera, Vejle (DK); Yuhendran Arunachalam, Tamil Nadu (IN); Klaus Hjorth Hansen, Jelling (DK); Kenneth Traelle Hoerning, Herning (DK); Kristian Sigsgaard Joergensen, Viborg (DK); Rupesh Makkinni, Adilakshmamba Puram (IN); Abhishek Patra, Chennai (IN); Anders Elkjaer Thomsen, Herning (DK); Berk Yildiz, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/922,554

(22) Filed: Oct. 22, 2024

(65) Prior Publication Data
US 2025/0137435 A1    May 1, 2025

(30) Foreign Application Priority Data
Oct. 31, 2023  (EP) .................................... 23207110

(51) Int. Cl.
*F03D 1/06* (2006.01)
*F03D 13/10* (2016.01)

(52) U.S. Cl.
CPC ......... *F03D 1/0669* (2023.08); *F03D 1/0691* (2013.01); *F03D 13/104* (2023.08); *F05B 2230/60* (2013.01); *F05B 2240/21* (2013.01)

(58) Field of Classification Search
CPC .... F03D 1/0669; F03D 1/0658; F03D 1/0691; F03D 7/0224
See application file for complete search history.

(56) References Cited

U.S. PATENT DOCUMENTS

| | | | |
|---|---|---|---|
| 8,215,912 B2 * | 7/2012 | Numajiri | F03D 7/0224 416/157 R |
| 11,493,028 B2 | 11/2022 | Liu et al. | |

(Continued)

FOREIGN PATENT DOCUMENTS

| | | |
|---|---|---|
| EP | 3680480 A1 | 7/2020 |
| EP | 3765738 B1 | 5/2022 |
| WO | 2011063815 A1 | 6/2011 |

OTHER PUBLICATIONS

European Search Report mailed Mar. 26, 2024 corresponding to EP Application No. 23207110.0 filed Oct. 31, 2023.

*Primary Examiner* — Courtney D Heinle
*Assistant Examiner* — John S Hunter, Jr.

(57) ABSTRACT

A hub hydraulic assembly for a wind turbine rotor is provided that includes plural support structures distributed circumferentially about a rotation axis of the hub is provided. In a first angular section of the circumferential distribution, a first support structure is provided and in a second different angular section of the circumferential distribution, a second support structure is provided. The first support structure includes at least a first support cantilever having a mounting end configured to be mounted to the hub and a free end, wherein at least one hydraulic component of the hub hydraulic assembly is mounted to the first support cantilever. The second support structure includes at least a second support cantilever having a mounting end configured to be mounted to the hub and a free end, wherein at least one hydraulic component of the hub hydraulic assembly is mounted to the second support cantilever.

14 Claims, 4 Drawing Sheets

(56) References Cited

U.S. PATENT DOCUMENTS 11,713,745 B2    8/2023   Park
2016/0312766 A1   10/2016   Rasmussen

* cited by examiner

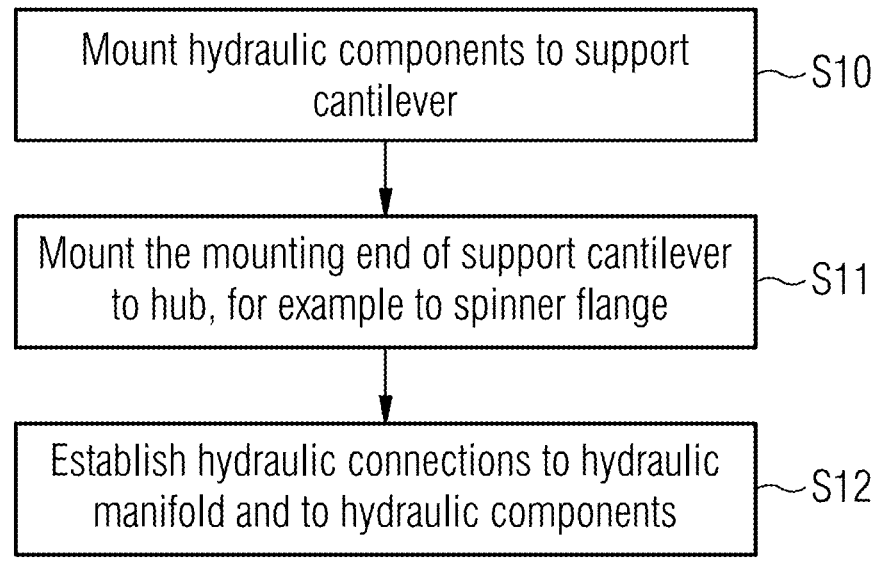

HUB HYDRAULIC ASSEMBLY FOR A WIND TURBINE ROTOR

CROSS-REFERENCE TO RELATED APPLICATIONS

This application claims priority to EP Application Serial No. 23207110.0, having a filing date of Oct. 31, 2023, the entire contents of which are hereby incorporated by reference.

FIELD OF TECHNOLOGY

The following relates to a hub hydraulic assembly for a wind turbine rotor, to a respective wind turbine rotor hub and to a method of assembling a hub hydraulic assembly.

BACKGROUND

Wind turbines often comprise a pitch drive to control the angle of the rotor blades of the wind turbine rotor. The amount of kinetic energy taken up from the wind can thereby be adjusted, for example to operate the wind turbine rotor at maximum aerodynamic efficiency or to pitch out the rotor blades in high wind situations to avoid damage. Some pitch drives are operated hydraulically, and the respective hydraulic system may include plural accumulators installed in the hub of the wind turbine. Hydraulic fluid, such as an oil or a water-based fluid, can be stored under pressure in the accumulators and can be released in a controllable way to operate hydraulic pistons that turn the respective rotor blade about its longitudinal axis.

Such hub hydraulic assembly (HHA) needs to be installed securely in the hub, since the hub rotates during operation of the wind turbine. A mounting structure can for example be provided that supports the accumulators and other components of the hydraulic system and that is firmly mounted to the walls of the hub. Although a safe and secure operation of the hydraulic pitch drive may thereby be achieved, the support structure of the hydraulic assembly is prone to wear. Due to the rotation of the hub, gravity acts periodically on the HHA and thus causes a different periodic loading of different parts of the HHA. Furthermore, during operation, aerodynamic forces act on the blades which are transferred to the hub structure. Parts of the hub may accordingly deform and may result in the HAA experiencing a corresponding fatigue wear. Parts of structure may thus be exposed to repeated and continuous wear and deformation and may accordingly suffer fatigue damage and may even break.

It is thus desirable to improve the resistance against such damage and to provide a reliable and secure way to mount the HHA structure in the hub by which the risk of such damage is reduced. It is particularly desirable to avoid fatigue damage to the brackets and connections by which the HHA structure is mounted to the hub.

The replacement of accumulators in a exemplary HHA structure is described in the document EP 3 765 738 B1. The document does however not address problems related to the fatigue damage to components of the HHA structure.

SUMMARY

An aspect relates to an improved hub hydraulic assembly for a wind turbine rotor. It is particularly desirable to reduce the risk of fatigue damage.

According to an embodiment of the present invention, a hub hydraulic assembly for a wind turbine rotor is provided. The hub hydraulic assembly (also abbreviated herein as HHA or as assembly) comprises plural support structures distributed circumferentially about a rotation axis of the hub. In a first angular section of the circumferential distribution, a first support structure is provided and in a second different angular section of the circumferential distribution, a second support structure is provided. The first support structure comprises at least a first support cantilever having a mounting end configured to be mounted to the hub and a free end, wherein at least one hydraulic component of the HHA is mounted to the first support cantilever. The second support structure comprises at least a second support cantilever having a mounting end configured to be mounted to the hub and a free end, wherein at least one hydraulic component of the HHA is mounted to the second support cantilever.

By using such arrangement with different, separate support cantilevers for mounting the hydraulic components, fatigue wear to the support structure of the HHA may be reduced significantly. As a cantilever has a free end, any deformation of the hub is not transferred to the mounting end where the cantilever is mounted to the hub. Therefore, the repeated loads that act on such mounting position in a conventional system due to the changing wind forces acting on the blades and the resulting periodic deformation of the hub can be avoided. Further, compared to a conventional system in which brackets are used that span across the hub and that connect different walls or positions throughout the hub, the strain due to periodic forces acting on the mounting position that result from the periodic gravitational loading may also be reduced. Conventional mounting structures of such assemblies may in particular suffer from two load paths, one due to the deformation of the hub (deformation load path) and the other due to gravity. Both combine into a significant displacement at the different mounting positions, which may even for neighboring mounting positions be relatively large. These differences have to be accommodated and compensated by the mounting structure and result in significant fatigue loads, as they occur periodically and constantly over the life of the wind turbine. Using separate support cantilevers in the separate angular sections, such fatigue wear may be reduced significantly.

The general conception is that to improve robustness against fatigue wear, the strength of the mounting structure is to be increased and the stiffness of the hub is to be improved in order to prevent deformation. Contrary to this general perception, it has been found that the fatigue loads can be reduced significantly by instead decoupling the mounting structure from the hub and using cantilevers with free ends to mount the hydraulic components. Embodiments of the present invention thus takes the opposite way and reduces the stiffness and strength of the mounting structure to reduce fatigue wear and the risk of damage.

The described configuration relates to the fully assembled state of the hub hydraulic assembly. At least two support cantilevers with two respective free ends may accordingly be present. A free end of a support cantilever may in particular be free to be deflected in two perpendicular lateral directions that are perpendicular to a longitudinal extension of the cantilever. The term "cantilever" may in particular imply that there is a free end that is not rigidly connected to the free end of another support cantilever or directly or indirectly to the hub; otherwise, such structure would not qualify as a cantilever.

In an embodiment, the HHA comprises a third support structure provided in a third different angular section of the circumferential distribution, wherein the third support structure comprises at least a third support cantilever having a mounting end mounted to the hub and a free end, wherein at least one hydraulic component of the HHA is mounted to the third support cantilever. This may allow the distribution of hydraulic components to further support cantilevers, thereby further reducing fatigue wear.

The first, second, and third angular sections may be of equal size and may together form a full circle. Each angular section may for example span 120°. Accordingly, a three-fold symmetry may be achieved that may correspond to the three-fold symmetry of three rotor blades of the wind turbine rotor. Such distribution may further ensure that the mass of the HHA is symmetrically distributed about the rotation axis, whereby a rotational imbalance of the hub may be avoided.

For example, mounting positions of the first, the second, and the third support cantilevers may be spaced apart by 120° around the rotation axis. A balanced distribution of the first, second, and third support cantilevers may thus be achieved.

Each support structure may be associated with a rotor blade of the wind turbine. For example, each support structure may support hydraulic components of the HHA for operating a hydraulic pitch drive of the respective rotor blade. As the hydraulic components for each rotor blade may thus be grouped together, the complexity of the HHA may be reduced.

In an embodiment, at least one, each support structure includes at least or exactly two separate support cantilevers. Each support cantilever may have a mounting end configured to be mounted to the hub and a free end. By distributing the hydraulic components for one rotor blade to at least two support cantilevers, the mounting area of each support cantilever may further be reduced, thereby reducing fatigue loads of the mount, in particular due to deformation of the hub. It should be clear that this is only an example and that in other embodiments, 1, 3, 4 or a different number of support cantilevers may be provided.

In an embodiment, at least one support cantilever of at least one of the support structures or of each support structure supports at least two, three, four, five, or six accumulators of the HHA. A relatively large number of accumulators may thus be supported by a single mounting point on the hub, which may result in a compact configuration and reduced space requirements. The accumulators may be mounted to the support cantilever and may extend in a longitudinal direction that is substantially parallel to a longitudinal extension of the respective support cantilever. Substantially parallel may mean parallel or a deviation from parallel by less than 10°, 5°, or 2°. For example, the accumulators may be distributed circumferentially about the support cantilever, or they may be arranged in a row or in two parallel rows on the support cantilever. Any other distribution of the accumulators on the support cantilever may also be used.

At least one support cantilever of at least one of the support structures or of each support structure may support at least one hydraulic manifold of the hub hydraulic assembly. Such hydraulic manifold may for example distribute hydraulic fluid to the accumulators, or collect hydraulic fluid from the accumulators and may further provide, in a controllable manner, hydraulic fluid to the hydraulic pitch drive of the respective rotor blade. In an embodiment, each angular section includes at least one support cantilever to which a hydraulic manifold is mounted. As an example, a hydraulic manifold may comprise one or more of a distribution manifold, a distribution valve, a control valve, and the like. Each hydraulic manifold may furthermore be hydraulically connected (directly or indirectly), e.g., via flexible lines, to a rotary connector that provides a hydraulic connection from the hub to a nacelle of the wind turbine. In other implementations, the hydraulic system may fully be comprised within the hub.

In an embodiment, at least one support cantilever of at least one of the support structures or of each support structure supports at least one grease pump of the HHA. Each angular section may for example comprise at least one support cantilever to which such crease pump is mounted. The grease pump may be configured grease a pitch bearing of a rotor blade associated with the respective support structure. The grease pump may be operated hydraulically.

Each support structure may for example comprise a support cantilever having fewer accumulators (such as (exactly) one, two, three, four, or five) and additionally having a grease pump and/or hydraulic manifold mounted thereto. Additionally or alternatively, each support structure may comprise a support cantilever having mounted thereto only accumulators, such as 2 to 10 accumulators, e.g., 4 to 8 accumulators. Each support structure may comprise the same number of support cantilevers to which corresponding hydraulic components are mounted. A rotational symmetry may thus be achieved that balances the mass around the rotation axis. Further support cantilevers comprising further hydraulic components, or a different distribution of the hydraulic components may certainly be provided for each support structure.

In an embodiment, each cantilever has a single leg configured to be mounted to the hub at a single mounting position, e.g., using a single flange. If two mounting points are provided, the deformation of the hub due to the hub loading may again result in respective differences at the mounting points that need to be compensated, leading to additional fatigue load. A single mounting point, which may be provided by single flange, is thus desirable.

In an embodiment, at least the first and the second support cantilevers, each support cantilever, are configured to be mounted at their respective mounting end to the hub by a full moment connection. The mounting end may for example comprise a flange, and the flange may be mounted to the hub using screws, bolts, or the like. The full moment of the cantilever may thus be taken up by such flange connection. Such flange may in particular be mounted directly to the hub, i.e., to a hub wall that is integral to the hub.

In an embodiment, at least the first and the second support cantilevers (each support cantilever) are configured to be mounted to an inner side of a wall of a hub body of the hub, for example to a spinner flange of the hub. In embodiments, it may be mounted to an outer side of the wall. As such spinner flange is generally made for bearing a load, and as it generally extends symmetrically about the rotation axis of the hub, and as it may further already comprise a mounting portion that may for example include through-holes, bolts or the like, the complexity of the HHA may be reduced and mounting of the support structures to the hub may be facilitated. Further, a rotationally symmetric mounting about the rotation axis may be ensured in a simple and efficient way. The mounting may occur such that an opening in the spinner flange of the hub is not covered by the support structures. Such mounting may facilitate access to a spinner that is mounted to the spinner flange or to the outside of the hub. A spinner may for example be an aerodynamic cover provided on the side of the hub that faces the wind during operation.

In embodiments, at least the first and the second support cantilevers (each support cantilever) are configured to be mounted to another part of the hub (not to a spinner flange), e.g., to one or more inner and/or outer walls of the hub that may be located anywhere on the hub. For example, the cantilevers may be mounted on a side of the hub opposite to the side of the hub that faces the wind. In embodiments, the hub may have no spinner flange and no spinner may be provided.

In an embodiment, at least the first and the second support cantilevers each comprise (or consist of) a single integral beam or plate that includes the mounting end. The beam or plate, respectively, may extend in a longitudinal direction away from the mounting end. Using such single integral beam or plate may facilitate manufacturing of the support cantilever and may further provide a robust structure resistant to fatigue wear. The beam or plate may be a cantilever beam or cantilever plate, respectively, that provides the respective cantilever function, e.g., that may have a free end that is allowed to deflect freely.

The beam may for example be a column; it may have a cylindrical or conical shape. The shape may be in particular be tapered from the mounting end towards the other end of the beam, which may be the free end of the cantilever or to which a further component that forms the free end of the cantilever may be mounted. In embodiments, the free end of at least one support cantilever may be provided by the free end of the beam or plate of the respective support cantilever. For at least one support cantilever, a plate or another component may be mounted to the other end of the beam or plate.

The support cantilever may comprise a mount configured to support at least two, three, four, or more hydraulic components of the hub hydraulic assembly, in particular a respective number of accumulators. Such mount may be formed integrally with the beam or plate. Complexity of the mounting structure may thereby be reduced further and mounting of the hydraulic components may be facilitated.

The mount may for example comprise at least two mounting brackets that are spaced apart in the longitudinal direction of the respective support cantilever (in particular of a respective beam), wherein each mounting bracket may have two, three, four, or more recesses configured to receive a corresponding number of accumulators of the HHA. These may be mounted directly to the at least two mounting brackets, or a further bracket part (clamp part) may be mounted to the at least two mounting brackets to firmly secure the accumulators.

In an embodiment, at least one of the support structures or each support structure comprises a platform configured to carry a person. The platform is mounted to a support cantilever of the support structure on a side of the support cantilever that faces the rotation axis. Each support cantilever of the respective support structure may be equipped with a respective platform. Access and maintenance of the hub may thereby be facilitated. In embodiments, since the orientation of the hub changes due to the rotation, it is beneficial to provide a respective platform on each support structure. That the platform is provided on a support cantilever may imply that the platform is not connected mechanically to any adjacent platforms of other support cantilevers, since otherwise, the support cantilever may no longer be a cantilever as it may lose its free end.

The platform may for example be mounted to the beam or plate of the respective support cantilever. It may for example be mounted to the mount, e.g., to the at least two mounting brackets, of the respective support cantilever. The brackets may for example have opposing first and second sides to which hydraulic components are mounted, and may have lateral sides to which the platform may be mounted, e.g., by respective mounting brackets screwed to these sides.

In an embodiment, at least one support cantilever comprises a central structure that provides the free end of the respective support cantilever, wherein the central structure extends substantially perpendicular to the rotation axis between the plural support structures. The central structure may comprise a support platform for supporting a person, and/or the central structure may comprise a central manifold connected by flexible hoses to two or more hydraulic manifolds mounted to respective two or more of the plural support structures, e.g., to the respective support cantilevers. By such central support structure, in particular support platform, service personnel may be supported in the hub even when the hub is in a different orientation, such as during mounting or assembly. Further, by providing such central platform as the free end of a respective support cantilever, forces that may result from a deformation of the hub during operation are not transferred to the central structure. Rather, the central structure is allowed to swing freely as it provides the free end of the respective support cantilever. Further, by providing a central manifold on such central structure, the providing of the hydraulic connections to the individual manifolds of the support structures associated with each blade may be facilitated. A connection to at least one hydraulic manifold of each support structure may in particular be provided. The configuration may in particular imply that the central structure is not mechanically rigidly mounted to other support cantilevers.

It should be clear that the free ends of the support cantilevers are not fixedly and rigidly mounted to each other or to any wall of the hub. The lateral movements of the free end of the support cantilever are thus not restricted. It should further be clear that there can be flexible hydraulic connections, e.g., by hoses, between the hydraulic components of the HHA, which do likewise not restrict the movement of the free end of the support cantilever.

According to an embodiment of the present invention, a wind turbine rotor hub including a hub hydraulic assembly having any of the configurations described herein is provided. According to a further embodiment, a wind turbine comprising such wind turbine rotor hub is provided. By such wind turbine rotor hub or wind turbine, advantages similar to those outlined further above may be achieved.

According to an embodiment of the present invention, a method of assembling a HHA of a wind turbine rotor is provided. In embodiments of the method, plural support structures are distributed circumferentially about a rotation axis of the hub, wherein in a first angular section of the circumferential distribution, a first support structure is provided and wherein in a second different angular section of the circumferential distribution, a second support structure is provided. Distributing the plural support structures comprises mounting a first support cantilever of the first support structure in the first angular section, and mounting a second support cantilever of the second support structure in the second angular section. The first support cantilever comprises a mounting end and a free end, wherein the mounting end is mounted to the hub, wherein at least one hydraulic component of the hub hydraulic assembly is mounted to the first support cantilever. The second support cantilever comprises a mounting end and a free end, wherein the mounting end is mounted to the hub, and wherein at least one hydraulic component of the hub hydraulic assembly is mounted to the second support cantilever. By such assembly method, a HHA having any of the advantages outlined above may be obtained. Further, due to the structure of the HHA, the mounting may be facilitated.

In embodiments, the method may be performed to assemble a HHA having any of the configurations disclosed herein, and embodiments of the method may comprise the respective assembly steps. Likewise, the hub hydraulic assembly may be assembled by any embodiments of the methods disclosed herein.

It is to be understood that the features mentioned above and those yet to be explained below can be used not only in the respective combinations indicated, but also in other combinations or in isolation, without leaving the scope of embodiments of the present invention. In embodiments, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 6 is a flow diagram illustrating a method of assembling a hub hydraulic assembly according to an embodiment.

DETAILED DESCRIPTION

Figure 1:
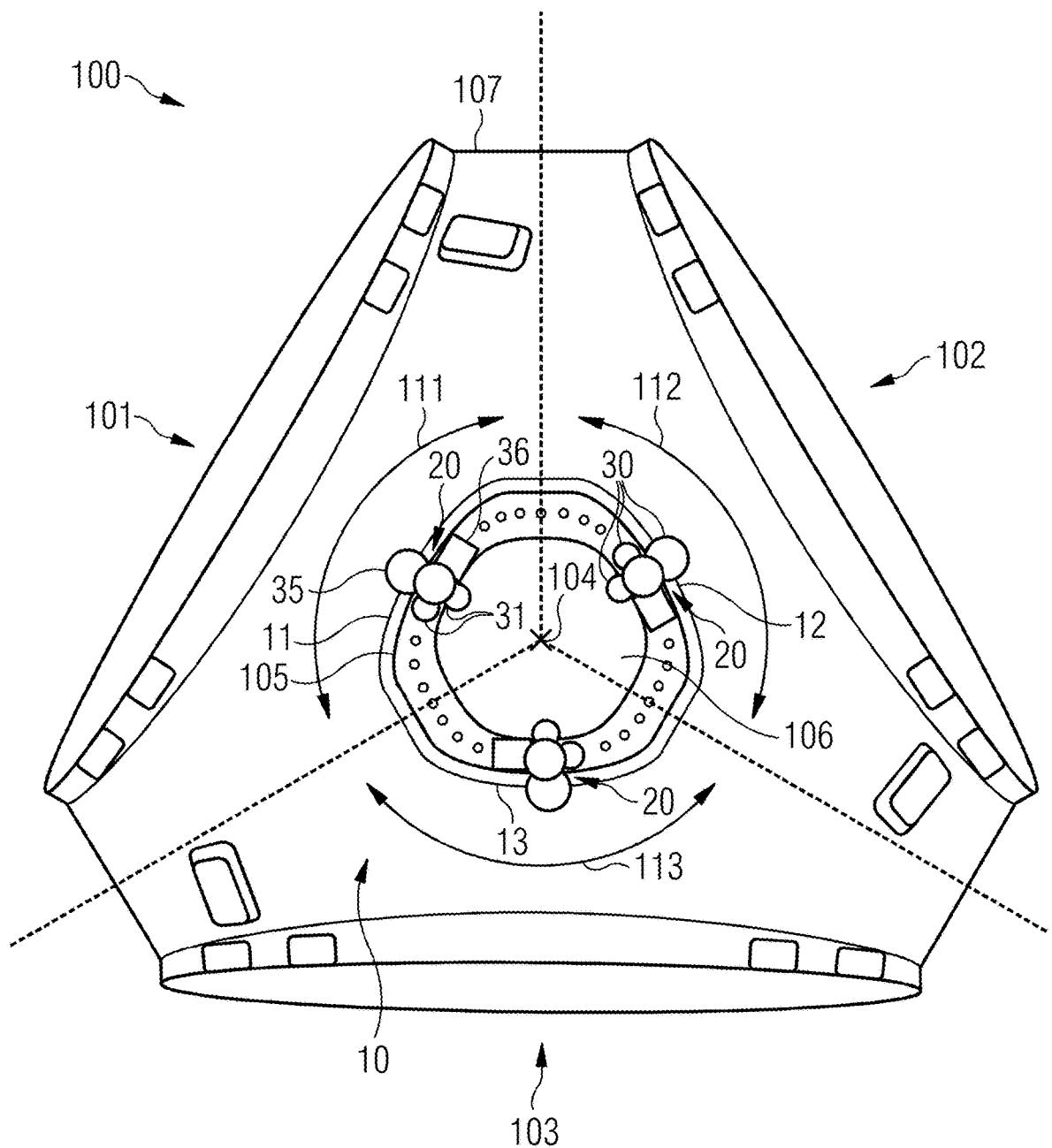
FIG. 1 is a schematic drawing illustrating a wind turbine rotor hub including a hub hydraulic assembly (HHA) according to an embodiment.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the conventional art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a hub 100 of a wind turbine. The hub 100 is illustrated in a front perspective view, seen in the direction in which the wind impinges onto the hub 100 during operation. A spinner that usually covers the hub 100 during operation is not shown. Hub 100 includes three rotor blade mounts 101, 102, 103 to which respective rotor blades are mounted. Hub 100 may also be configured to carry fewer or more rotor blades. The rotor blade mounts 101 to 103 are generally equipped with a pitch bearing and a pitch drive that allows rotation of the rotor blade about the longitudinal axis of the blades, i.e., about an axis of rotation that passes centrally and perpendicularly through the respective opening in the hub to which the rotor blade is mounted. Hub 100 itself, including the mounted rotor blades, rotates about a rotation axis 104 that is perpendicular to the drawing plane. Hub 100 includes a spinner flange 105 to which a spinner that provides an aerodynamic cover of the hub is mounted. A manhole 106 is provided radially inwardly of spinner flange 105 to allow access to the spinner and/or to the outside of the hub, e.g., when hub 100 is mounted to the wind turbine. In other implementations, the hub may not have a spinner flange and no spinner may be provided.

Hub 100 includes a hub hydraulic assembly 10 mounted inside the hub body 107 of hub 100. HHA 10 includes plural support structures 11, 12, 13 that support hydraulic components 30 of the HHA 10. The support structures 11 to 13 are distributed circumferentially around the rotation axis 104. In embodiments, in each angular section 111, 112, 113 around the rotation axis 104, a respective support structure 11, 12, 13 is provided. Each support structure 11, 12, 13 may be associated with a rotor blade and may provide hydraulic functions for a hydraulic pitch drive of the corresponding rotor blade mount 101, 102, 103. Each support structure 11, 12, 13 includes at least one support cantilever 20 to which the hydraulic components 30 are mounted.

Hydraulic components 30 may for example include one or a combination of an accumulator 31, a hydraulic manifold 36, and a grease pump 35. By employing respective support cantilevers 20 for mounting the hydraulic components 30, the forces that act on the support structure due to deformation of the hub body 107 and due to gravitational forces may be reduced significantly, thereby reducing fatigue wear and premature failure. There is in particular at least one support cantilever in each angular section 111 to 113, the support cantilever being mounted at one end to the hub and being free at its respective other end. This means that the free ends of the support cantilevers 20 are not connected in a mechanically rigid manner, they are in particular free to move in at least two perpendicular spatial directions that are perpendicular to the longitudinal extension of the support cantilever. In the top view of FIG. 1, if the axes in the drawing plane are taken to be the X-axis and the Y-axis, and perpendicular to the drawing plane the Z-axis, the free ends of the cantilevers 20 are allowed to move in X- and Y-directions.

Further, by distributing the support cantilevers about the rotational axis 104 in the different angular sections 111 to 113, a rotationally symmetric distribution may be achieved that balances the mass about the rotation axis 104, so that rotational imbalances may be avoided. Such symmetric distribution is optional and in other configurations, the support cantilevers may not be symmetrically distributed about the rotation axis. For the three blade rotor hub 100 of FIG. 1, the mounting positions of the three support cantilevers 20 may be spaced apart by 120° in angular direction. Each support structure 11, 12, 13 may certainly comprise further support cantilevers 20, wherein it is desired that a corresponding number of support cantilevers having a corresponding configuration is provided in each angular segment 111 to 113. The second support cantilevers 20 may again be spaced apart by 120° about rotation axis 104. A rotationally balanced configuration may thus be achieved even if plural support cantilevers 20 are employed in each angular section.

If hub 100 is configured to carry fewer or more rotor blades, there may correspondingly be fewer or more angular sections in which the support structures are distributed (e.g., two or four). In the example of FIG. 1, the support cantilevers 20 are mounted inside hub body 107 to spinner flange 105. In other examples, they may be mounted at different positions within hub body 107, for example further outwardly in radial direction from spinner flange 105, or on the opposite wall of hub body 107 that is adjacent to the nacelle of the wind turbine. A spinner flange is optional and may not be present on some hubs. Also for such different mounting positions, the support cantilevers can be distributed in the respective angular sections. Each support structure 11, 12, 13 may carry hydraulic components for the pitch drive of the associated rotor blade mount 101, 102, 103. In other implementations, hydraulic components for one hydraulic pitch drive may be mounted to the support cantilever arranged adjacent to another pitch drive; however, such configuration is not desired as it may require additional or longer hydraulic connections.

Each angular section 111, 112, 113 may in particular comprise the respective rotor blade mount 101, 102, and 103, i.e., the respective mount may lie within the respective angular section. The support structure 11, 12, 13 is arranged opposite to the associated rotor blade mount 101, 102, 103. The number and/or length of the hydraulic connections may thereby be reduced.

Figure 2:
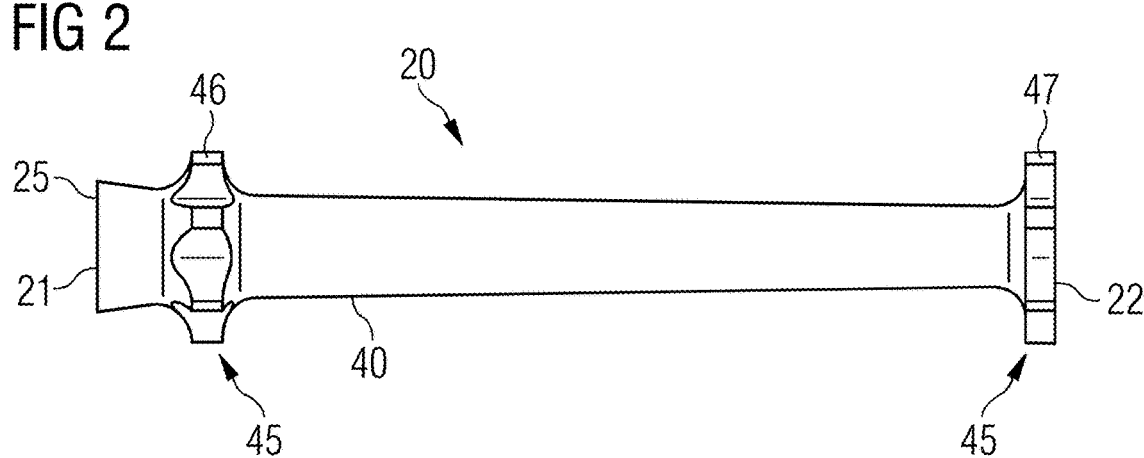
FIG. 2 is a schematic drawing illustrating a support cantilever in form of a beam according to an embodiment.

Support cantilever 20 may comprise or consist of a beam 40, which may have a column shape, a plate-shape, or the like. FIG. 2 illustrates an exemplary implementation of support cantilever 20 as a beam 40 that provides a mounting end 21 and a free end 22 of the support cantilever 20. As explained further below, further components may be mounted to the beam 40 and may provide the free end 22 of support cantilever 20. Beam 40 has a conical or cylindrical shape; it is tapered towards the free end 22 in the example of FIG. 2. In other implementations, it may have a square, oval or any other suitably shaped cross section. It further comprises a mount 45 for mounting one or more hydraulic components of HHA 10. Mount 45 may be formed integrally with beam 40 or may be mounted to beam 40. Beam 40 and mount 45 may be formed as a single integral piece, which may for example be die-cast from metal. Mount 45 may comprise mounting brackets 46 and 47 that are spaced apart in the longitudinal direction of beam 40 in order to provide a secure support for the hydraulic components. The beam 40 may certainly have a different shape, such as a square or rectangular, or other polygonal cross-section, it may not be tapered and the mount may be provided at different positions of beam 40.

Figure 3:
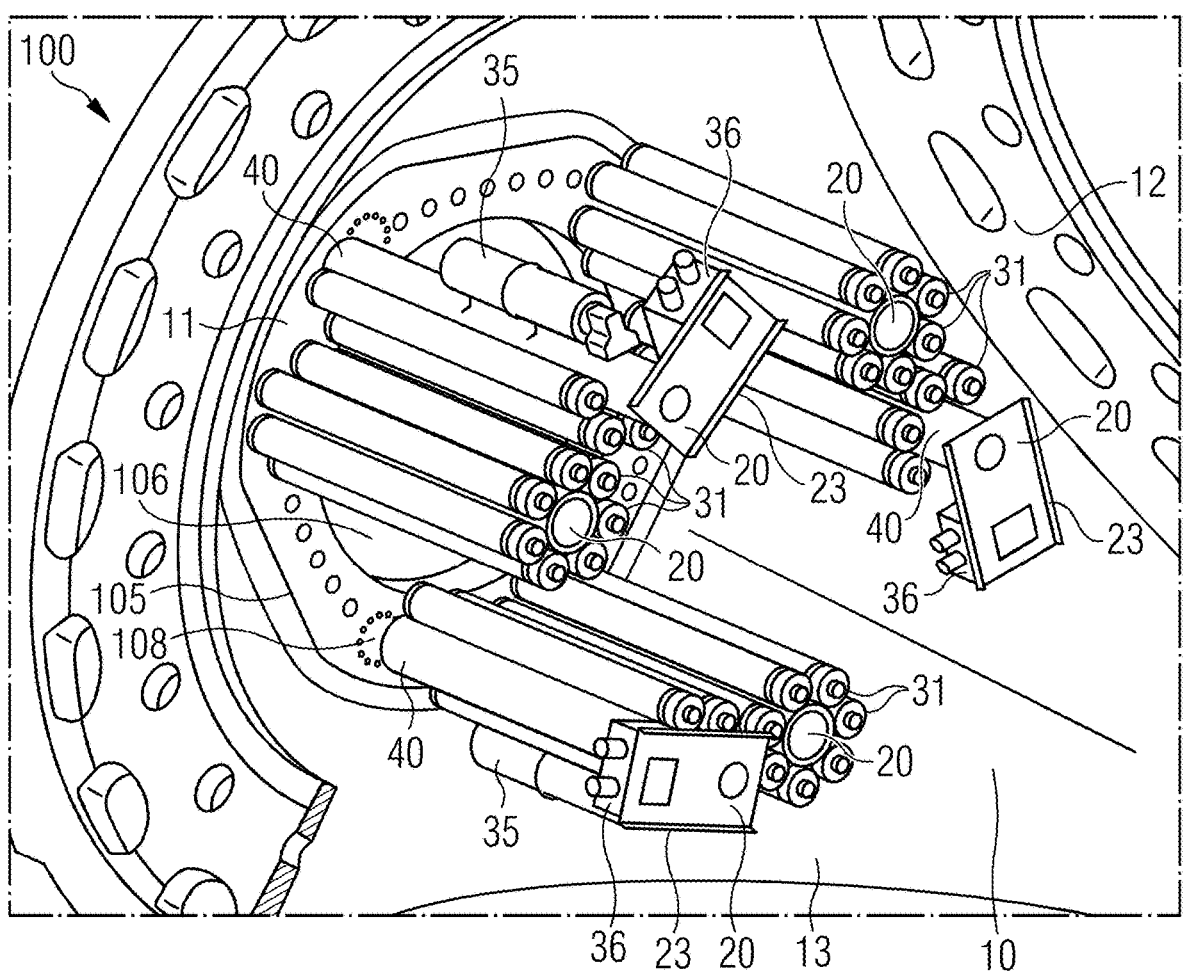
FIG. 3 is a schematic drawing showing a hub including a hub hydraulic assembly according to an embodiment which employs the beam of FIG. 2.

FIG. 3 illustrates an embodiment of hub 100 and of HHA 10. Spinner flange 105 of hub 100 includes a mounting section 108 having through-holes to which a mounting flange 25 on mounting end 21 of the support cantilever is mounted, via respective bolts or screws. Each support structure 11, 12, 13 comprises two support cantilevers 20 carrying hydraulic components. In each support structure, a first support cantilever 20, which is configured as shown in FIG. 2, carries six hydraulic accumulators 31. A second support cantilever 20 carries four or five hydraulic accumulators 31 and further carries a grease pump 35. Grease pump 35 may be operated hydraulically and may provide grease to the pitch bearing of the associated rotor blade mount. A mounting plate 23 is furthermore mounted to the beam 40 of the second support cantilever 20 and provides the free end 22 thereof. To the mounting plate 23, the hydraulic manifold 36 is mounted. Again, the free ends of the first and second support cantilevers 20 of each mounting structure 11, 12, 13 are not mechanically rigidly connected, so that these free ends are allowed to move in the X-/Y-plane. Accordingly, forces generated by a deformation of spinner flange 105 due to forces acting on hub 100, and gravitational forces acting on the respective cantilever 20 are not transferred to the other support cantilevers 20 of either the same support structure or of the other support structures. Fatigue wear can thereby be reduced significantly.

The arrangement and configuration of the plural support cantilevers 20 is such that the manhole 106 provided in spinner flange 105 is not covered by the hub hydraulic assembly. Accordingly, the access to the outside of the hub body 107 through the spinner flange 105 is not impeded by the HHA 10. Further, as can be seen, all first support cantilevers are mounted with a 120° offset around the rotational axis 104, and/or second support cantilevers 20 are likewise mounted at mounting positions offset by 120°. The arrangement of the three support structures 11 to 13 is thus symmetric about the rotational axis 104, thus resulting in a balanced rotation. In FIG. 3, hydraulic connections that are certainly present to connect the hydraulic manifolds 36 to the respective accumulators and to the hydraulic pitch drive, as well as to a hydraulic pump are not shown. Such hydraulic connections are generally flexible and do accordingly not impede the relative movement of the free ends 22 of the support cantilevers 20.

Figure 4:
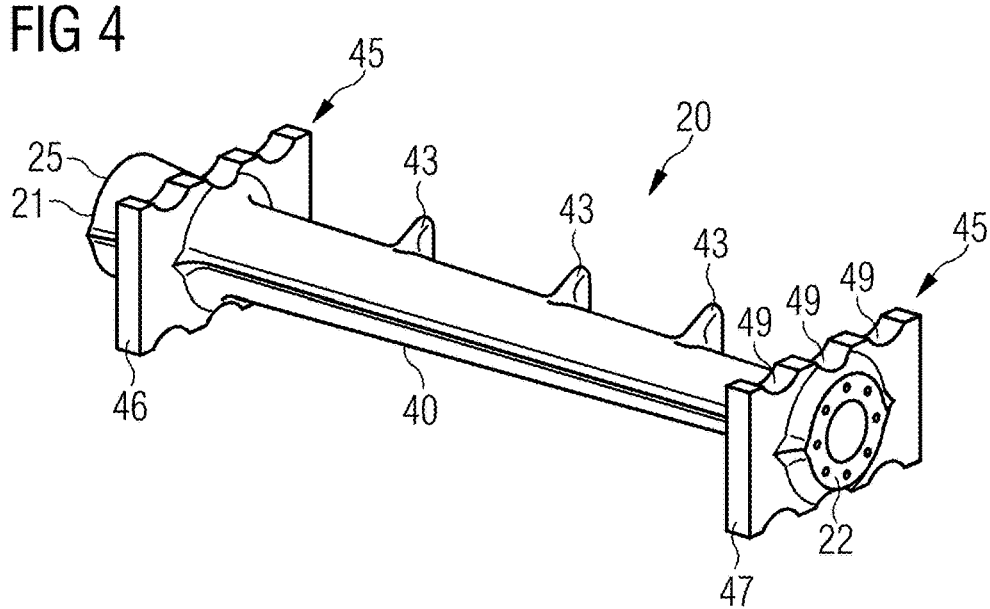
FIG. 4 is a schematic drawing illustrating a support cantilever in form of a beam according to a further embodiment.

FIG. 4 illustrates an alternative configuration of the support cantilever 20 of FIG. 2. Only differences are thus explained. In FIG. 2, the mount 45 is configured such that plural accumulators are distributed circumferentially about the beam 40, their longitudinal extension being essentially parallel to the longitudinal extension of beam 40. In FIG. 4, mount 45, in particular the mounting brackets 46 and 47, are configured for an arrangement of the accumulators 31 in two parallel planes, i.e., in two rows. Mounting brackets 46, 47 comprise respective recesses 49 in which the accumulators 31 are taken up. The accumulators are then clamped by a respective clamping bracket 48 (please see FIG. 5). Further, a mount 43 for mounting a grease pump is illustrated. Such configuration may allow the use of the same type of beam 40 for both support cantilevers that carry only (e.g., six) accumulators 31 and four support cantilevers that carry fewer accumulators but carry a grease pump and optionally a hydraulic manifold. Again, beam 40 including mounts 43, 45 may be die-cast as single integral piece. Beam 40 exhibits the mounting end 21 with a mounting flange 25. At the other end, the free end 22 may be provided, or additional components that provide the free end 22 may be mounted. A respective mounting flange for mounting such additional components may be present at this end of beam 40, as schematically illustrated in FIG. 4.

Figure 5:
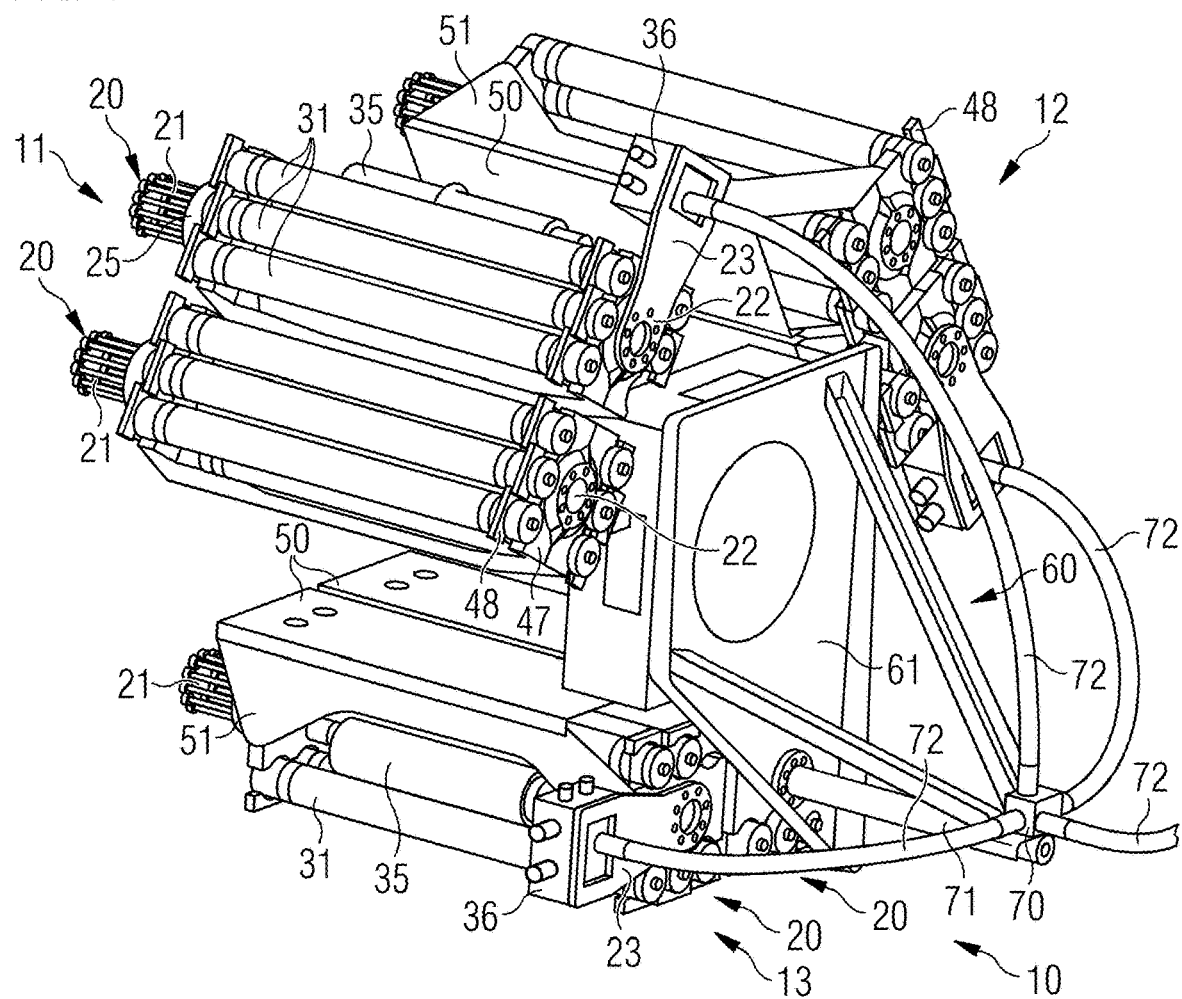
FIG. 5 is a schematic drawing showing a hub hydraulic assembly according to a further embodiment which employs the beam of FIG. 4.

FIG. 5 illustrates an embodiment of the HHA 10 that employs the cantilever support 20 of FIG. 4. The embodiment is a modification of the embodiment of FIG. 3, so that the above explanations are equally applicable. To simplify the presentation, the hub 10 is not shown in FIG. 5 but may certainly be present. Similar to FIG. 3, each support structure 11, 12, 13 includes a first and a second support cantilever 20. The first support cantilever 20 carries six accumulators 31 that are mounted by the mounting brackets 46, 47 of FIG. 4 and are clamped by a respective clamping bracket 48. Bolts are illustrated at the mounting end 21, which reach through the holes of the mounting section 108 in the spinner flange 105. The second support cantilever 20 again carries a mounting plate 23 to which the hydraulic manifold 36 is mounted. It further includes five accumulators 31 and a grease pump 35. Although the first and second support cantilevers 20 of each support structure 11, 12, 13 are arranged adjacent to each other, their free ends 22 are not mechanically connected and are free to move.

Assembly 10 may include a platform 50 mounted to at least one support cantilever 20. Platform 50 is configured to support a person, such as service personnel. Platform 50 may allow the person to step onto it and to access and climb through the manhole 106 provided in spinner flange 105. In an embodiment, at least one platform 50 is provided for each support structure 11, 12, 13. For different rotational orientations of hub 100, it can thus be ensured that a platform 50 is in a substantially horizontal orientation so that the manhole 106 can be accessed by service personnel. As shown in FIG. 5, each support cantilever 20 may be equipped with a respective platform 50.

A platform mount 51 may be provided to mount the platform 50 to the support cantilever 20, in particular to the beam 40. Platform mount 51 may for example be mounted, in particular screwed, to the mounting brackets 46, 47, e.g., to the sides thereof. Platform 50 may thus be provided in a way that does not increase complexity and that maintains the compactness of the mounting structures 11 to 13.

The mounting brackets 46, 47 may accordingly be configured to receive a platform mount for mounting a platform 50 that is configured to support a person. In embodiments, the mounting brackets 46, 47 may comprise opposing sides that provide a mounting surface, which is substantially perpendicular to a longitudinal extension of the beam 40, for mounting the platform 50.

In the embodiment of FIG. 5, a central structure 60 is furthermore mounted to one of the support cantilevers 20. Central structure 60 includes a central platform 61 that extends radially outwardly from the rotational axis 104 between the support structures 11, 12, 13. Central platform 61 may provide support for a person, so that a service personnel can access the inside of the hub or the HHA 10 if the hub is in a different orientation, such as during assembly or mounting of the hub. Central structure 60 further includes a central manifold 70 that is mounted by a mounting structure 71 of the central structure 60. Mounting structure 71 may be mounted to the end of the beam 40, and may additionally or alternatively be mounted to the central platform 61. Respective struts are exemplarily illustrated in FIG. 5. Central structure 60 may only comprise the central platform 61, or the central manifold 70. The central manifold 70 is furthermore connected by flexible hoses 72 to the manifolds 36 of the support structures 11 to 13, in particular to each manifold 36. The central manifold 70 may for example distribute pressurized hydraulic fluid to each of the manifolds 36. Accordingly, hydraulic pressure may be supplied from a central pump, which may be arranged inside the hub 100 or outside of the hub, for example in a nacelle of the wind turbine. Hydraulic pressure may be accumulated in the accumulators 31 and may then be distributed in a controlled manner, via the respective manifolds 36, to the hydraulic pitch drives of the rotor blades.

Since the central structure 60 is mounted to a single support cantilever 20, it forms the free end of the respective support cantilever. The central structure 60 is thus allowed to swing freely in X-/Y-direction, i.e., perpendicular to the longitudinal extension of the support cantilever 20 (in particular the beam 40), and thus does likewise not transfer forces that result from a deformation of the hub to the support cantilever 20 and in particular to its mount at mounting end 21. Therefore, also in such configuration with a central structure 60, the support cantilevers are allowed to swing freely at their free end, and the forces acting due to hub deformation and thus fatigue wear can be reduced significantly.

Although the above embodiments have been described with respect to a hub to which three rotor blades are mounted, and in which each support structure includes two support cantilevers 20, there may be fewer or more rotor blades in other embodiments, and fewer or more support cantilevers 20. Further, central structure 60 and platforms 50 are optional. Also, instead of employing a beam 40 having a column shape, as illustrated in FIGS. 2 and 4, a plate on which respective mounts for the one or more hydraulic components are provided may likewise be employed. Other shapes of the support cantilever 20 are likewise conceivable. Further, although the support cantilevers 20 are mounted to the spinner flange 105 in the embodiments of FIGS. 3 and 5, other mounting positions are also conceivable. However, mounting to the spinner flange 105 has the benefit of providing a safe mounting position that provides a compact configuration and does not require any additional components or strengthening of the wall of the hub body 107.

FIG. 6 is a flow diagram illustrating a method of assembling a HHA 10 according to an embodiment. In step S10, one or more hydraulic components 30 are mounted to the support cantilever 20, in particular to a cantilever beam 40 thereof. One or more accumulators, a grease pump and/or a hydraulic manifold may for example be mounted. In step S11, the mounting end 21 of the support cantilever 20 is mounted to the hub, for example to the spinner flange 105. In step S12, hydraulic connections are established to the hydraulic components, for example a hydraulic connection to the associated hydraulic pitch drive and a hydraulic connection to the central manifold 70. As mentioned, such connections may be established using flexible hydraulic hoses. Steps S10 to S12 may be repeated for one or more support cantilever of each support structure. Accordingly, a HHA 10 can be assembled in a fast and efficient manner. It should be clear that the order of the steps may be reversed and that some steps may be performed repeatedly. For example, first hydraulic connections may be established when mounting the hydraulic components to the support cantilever 20, and further hydraulic connections may be established when the cantilever 20 has been mounted to the hub.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A hub hydraulic assembly for a wind turbine rotor, wherein the hub hydraulic assembly comprises:
   a plurality of support structures distributed circumferentially about a rotation axis of a hub, wherein in a first angular section of the circumferential distribution, a first support structure is provided and wherein in a second different angular section of the circumferential distribution, a second support structure is provided,
   wherein: the first support structure comprises a first support cantilever and a second support cantilever, the first support cantilever and the second support cantilever of the first support structure being mechanically independent from one another, the first support cantilever and the second support cantilever of the first support structure each respectively having a mounting end configured to be mounted to the hub and a free end, each respective free end of the first support cantilever and the second support cantilever of the first support structure not mechanically connected or rigidly fixed to other cantilevers or hub parts except at the mounting end, each respective free end having freedom of movement in at least two directions that are mutually perpendicular relative to a respective longitudinal axis of the first support cantilever and the second support cantilever of the first support structure, wherein at least one hydraulic component of the hub hydraulic assembly is mounted to the first support cantilever and/or to the second support cantilever of the first support structure, the second support structure comprises a first support cantilever and a second support cantilever, the first support cantilever and the second support cantilever of the second support structure being mechanically independent from one another, the first support cantilever and the second support cantilever of the second support structure each respectively having a mounting end configured to be mounted to the hub and a free end, each respective free end of the first support cantilever and the second support cantilever of the second support structure not mechanically connected or rigidly fixed to other cantilevers or hub parts except at the mounting end, each respective free end having freedom of movement in at least two directions that are mutually perpendicular relative to a respective longitudinal axis of the first support cantilever and the second support cantilever of the second support structure, each respective cantilever of the first support cantilever and the second support cantilever of the first support structure and of the second support structure being mechanically independent from one another permit load decoupling, which inhibits structural fatigue wear in the support structures.

2. The hub hydraulic assembly according to claim 1, further comprising a third support structure provided in a third different angular section of the circumferential distribution, wherein the third support structure comprises at least a third support cantilever having a mounting end mounted to the hub and a free end, wherein at least one hydraulic component of the hub hydraulic assembly is mounted to the third support cantilever.

3. The hub hydraulic assembly according to claim 1, wherein each support structure is associated with a rotor blade of the wind turbine rotor, wherein each support structure supports hydraulic components of the hub hydraulic assembly for operating a hydraulic pitch drive of the respective rotor blade.

4. The hub hydraulic assembly according to claim 1, wherein at least one support cantilever of at least one of the support structures or of each support structure supports at least 2, 3, 4, 5, or 6 accumulators of the hub hydraulic assembly.

5. The hub hydraulic assembly according to claim 1, wherein at least one support cantilever of at least one of the support structures or of each support structure supports at least one hydraulic manifold of the hub hydraulic assembly.

6. The hub hydraulic assembly according to claim 1, wherein at least one support cantilever of at least one of the support structures or of each support structure supports at least one grease pump of the hub hydraulic assembly.

7. The hub hydraulic assembly according to claim 1, wherein at least the first support cantilever and the second support cantilever are configured to be mounted at the respective mounting end to the hub by a full moment connection.

8. The hub hydraulic assembly according to claim 1, wherein at least the first support cantilever and the second support cantilever are configured to be mounted to an inner side of a wall of a hub body of the hub.

9. The hub hydraulic assembly according to claim 1, wherein at least the first support cantilever and the second support cantilever each comprises a single integral beam or plate that includes the mounting end, wherein the beam or plate extends in a longitudinal direction away from the mounting end.

10. The hub hydraulic assembly according to claim 1, wherein the first support cantilever and/or the second support cantilever comprises a mount configured to support at least 2, 3, or 4 hydraulic components of the hub hydraulic assembly, wherein the mount is formed integrally with a cantilevered beam or plate of the support cantilever.

11. The hub hydraulic assembly according to claim 1, wherein at least one of the support structures or each support structure comprises a platform configured to carry a person, wherein the platform is mounted to a support cantilever of the support structure on a side of the support cantilever that faces the rotation axis.

12. The hub hydraulic assembly according to claim 1, wherein at least one support cantilever comprises a central structure that provides the free end of the respective support cantilever, wherein the central structure comprises a support platform that extends substantially perpendicular to the rotation axis between the plurality of support structures for supporting a person and/or wherein the central structure comprises a central manifold connected by flexible hoses to two or more hydraulic manifolds mounted to respective two or more of the plurality of support structures.

13. A wind turbine rotor hub including a hub hydraulic assembly according to claim 1.

14. A method of assembling a hub hydraulic assembly of a wind turbine rotor, the method comprising distributing a plurality of support structures circumferentially about a rotation axis of the hub, wherein in a first angular section of the circumferential distribution, a first support structure is provided and wherein in a second different angular section of the circumferential distribution, a second support structure is provided, wherein distributing the plurality of support structures comprises:

mounting a first support cantilever and a second support cantilever of the first support structure in the first angular section, the first support cantilever and the second support cantilever of the first support structure being mechanically independent from one another, wherein the first support cantilever and the second support cantilever of the first support structure each respectively comprises a mounting end and a free end, not mechanically connecting or rigidly fixing each respective free end of the first support cantilever and the second support cantilever of the first support structure to other cantilevers or hub parts except at the mounting end, each respective free end having freedom of movement in at least two directions that are mutually perpendicular relative to a respective longitudinal axis of the first support cantilever and the second support cantilever of the first support structure, wherein at least one hydraulic component of the hub hydraulic assembly is mounted to the first support cantilever and/or to the second support cantilever of the first support structure;

mounting a first support cantilever and a second support cantilever of the second support structure in the second angular section, the first support cantilever and the second support cantilever of the second support structure being mechanically independent from one another, wherein the first support cantilever and the second support cantilever of the second support structure each respectively comprises a mounting end and a free end, and not mechanically connecting or rigidly fixing each respective free end of the first support cantilever and the second support cantilever of the second support structure to other cantilevers or hub parts except at the mounting end, each respective free end having freedom of movement in at least two directions that are mutually perpendicular relative to a respective longitudinal axis of the first support cantilever and the second support cantilever of the second support structure, each respective cantilever of the first support cantilever and the second support cantilever of the first support structure and the second support structure being mechanically independent from one another permit load decoupling, which inhibits structural fatigue wear in the support structures.

\* \* \* \* \*